United States Patent
Park et al.

(10) Patent No.: US 9,666,369 B2
(45) Date of Patent: May 30, 2017

(54) DIELECTRIC CERAMIC COMPOSITION AND MULTILAYER CERAMIC CAPACITOR CONTAINING THE SAME

(71) Applicant: SAMSUNG ELECTRO-MECHANICS CO., LTD., Suwon-si, Gyeonggi-do (KR)

(72) Inventors: Jae Sung Park, Suwon-si (KR); Chan Hee Nam, Suwon-si (KR); Doo Young Kim, Suwon-si (KR); Seok Hyun Yoon, Suwon-si (KR); Du Won Choi, Suwon-si (KR); Chang Hoon Kim, Suwon-si (KR)

(73) Assignee: Samsung Electro-Mechanics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/040,237

(22) Filed: Feb. 10, 2016

(65) Prior Publication Data

US 2016/0307701 A1 Oct. 20, 2016

(30) Foreign Application Priority Data

Apr. 16, 2015 (KR) ........................ 10-2015-0053947

(51) Int. Cl.
*C04B 35/00* (2006.01)
*H01G 4/12* (2006.01)
(Continued)

(52) U.S. Cl.
CPC ....... *H01G 4/1218* (2013.01); *C04B 35/4682* (2013.01); *C04B 35/49* (2013.01);
(Continued)

(58) Field of Classification Search
CPC ..... C04B 35/46; C04B 35/462; C04B 35/465; C04B 35/468; C04B 35/4682; C04B 35/4686
(Continued)

(56) References Cited

U.S. PATENT DOCUMENTS 5,612,268 A * 3/1997 Iwamoto ............. C04B 35/4682
501/137
5,852,542 A * 12/1998 Wada .................. H01G 4/1227
361/303
(Continued)

FOREIGN PATENT DOCUMENTS

JP 2007-507406 A 3/2007
JP 2011-011918 A 1/2011
(Continued)

OTHER PUBLICATIONS

Japanese Office Action issued in Application No. 2016-064219 dated Apr. 4, 2017, with English translation.

*Primary Examiner* — Noah Wiese
(74) *Attorney, Agent, or Firm* — McDermott Will & Emery LLP

(57) ABSTRACT

There are provided a dielectric ceramic composition and a multilayer ceramic capacitor containing the same. The dielectric ceramic composition according to the present disclosure may contain a main base material ingredient and a first accessory ingredient, wherein the first accessory ingredient contains samarium (Sm) and other rare earth (RE) elements, and a ratio (a/b) of a content (a) of samarium (Sm) to a content (b) of other rare earth elements in the first accessory ingredient satisfies $0.1 \leq a/b \leq 2.0$.

21 Claims, 2 Drawing Sheets

(51) Int. Cl.
*H01G 4/30* (2006.01)
*C04B 35/468* (2006.01)
*C04B 35/49* (2006.01)

(52) U.S. Cl.
CPC ......... *H01G 4/1227* (2013.01); *H01G 4/1245* (2013.01); *H01G 4/30* (2013.01); *C04B 2235/3206* (2013.01); *C04B 2235/3208* (2013.01); *C04B 2235/3215* (2013.01); *C04B 2235/3217* (2013.01); *C04B 2235/3224* (2013.01); *C04B 2235/3225* (2013.01); *C04B 2235/3227* (2013.01); *C04B 2235/3229* (2013.01); *C04B 2235/3239* (2013.01); *C04B 2235/3241* (2013.01); *C04B 2235/3251* (2013.01); *C04B 2235/3262* (2013.01); *C04B 2235/3272* (2013.01); *C04B 2235/3275* (2013.01); *C04B 2235/3279* (2013.01); *C04B 2235/3281* (2013.01); *C04B 2235/3284* (2013.01); *C04B 2235/3293* (2013.01); *C04B 2235/3294* (2013.01); *C04B 2235/3418* (2013.01); *C04B 2235/36* (2013.01); *C04B 2235/5436* (2013.01); *C04B 2235/652* (2013.01); *C04B 2235/6582* (2013.01); *C04B 2235/781* (2013.01); *C04B 2235/786* (2013.01)

(58) Field of Classification Search
USPC .................................. 501/134, 135, 136, 137
See application file for complete search history.

(56) References Cited

U.S. PATENT DOCUMENTS

| | | | |
|---|---|---|---|
| 6,380,116 B1* | 4/2002 | Okamatsu | H01G 4/1227 361/321.4 |
| 8,358,494 B2 | 1/2013 | Nishimura et al. | |
| 8,404,607 B2* | 3/2013 | Fukuda | B82Y 30/00 361/321.4 |
| 2007/0267948 A1 | 11/2007 | Feltz et al. | |
| 2008/0112109 A1* | 5/2008 | Muto | C04B 35/4682 361/301.4 |
| 2009/0310279 A1* | 12/2009 | Sasabayashi | C04B 35/4682 361/321.4 |
| 2010/0328844 A1* | 12/2010 | Nishimura | C04B 35/462 361/321.5 |
| 2011/0216471 A1 | 9/2011 | Fukuda et al. | |
| 2013/0250478 A1 | 9/2013 | Kim et al. | |

FOREIGN PATENT DOCUMENTS

| | | |
|---|---|---|
| JP | 2011-178632 A | 9/2011 |
| JP | 2013-193955 A | 9/2013 |
| KR | 95-31996 A | 12/1995 |
| KR | 10-0174388 B1 | 4/1999 |
| KR | 1999-0075846 A | 3/2000 |

* cited by examiner

DIELECTRIC CERAMIC COMPOSITION AND MULTILAYER CERAMIC CAPACITOR CONTAINING THE SAME

CROSS-REFERENCE TO RELATED APPLICATION

This application claims the benefit of priority to Korean Patent Application No. 10-2015-0053947, filed on Apr. 16, 2015 with the Korean Intellectual Property Office, the entirety of which is incorporated herein by reference.

TECHNICAL FIELD

The present disclosure relates to a dielectric ceramic composition having high permittivity and excellent reliability, and a multilayer ceramic capacitor containing the same.

BACKGROUND

In general, electronic components containing a ceramic material, such as capacitors, inductors, piezoelectric elements, varistors, thermistors, or the like, include a ceramic body formed of a ceramic material, internal electrodes formed in the ceramic body, and external electrodes mounted on external surfaces of the ceramic body to be connected to the internal electrodes.

Among ceramic electronic components, a multilayer ceramic capacitor includes a plurality of stacked dielectric layers, internal electrodes disposed to face each other with respective dielectric layers interposed therebetween, and external electrodes electrically connected to the internal electrodes.

Multilayer ceramic capacitors have been widely used as components in mobile communications devices such as computers, personal data assistants (PDAs), mobile phones, and the like, due to inherent advantages thereof, such as small size, high capacitance, ease of mounting, and the like.

Generally, in order to develop high capacitance multilayer ceramic capacitors, the dielectric layers included therein should be thinned. Therefore, there has been demand for a dielectric composition allowing for a high permittivity to be implemented without decreasing reliability in spite of the thinness of the dielectric layers, and having a small capacitance decrease rate depending on a direct current (DC) voltage applied thereto.

In accordance with the trend for high capacitance and thinness of multilayer ceramic capacitors, as described above, there is great demand to design a dielectric composition for a capacitor having high permittivity. To date, generally, in a technology for securing high permittivity, the object of achieving high permittivity has been achieved by simply causing particle growth to adjust the number of dipoles in crystals.

At the time of designing a high permittivity composition by particle growth as described above, however, a rate of change of capacitance, depending on temperature and a level of DC voltage applied thereto may be increased, and the number of particles per layer of the dielectric layers may be decreased, such that reliability may be deteriorated.

In order to solve the above-mentioned problem, a method allowing permittivity to be increased without particle growth has been required.

SUMMARY

An aspect of the present disclosure provides a dielectric ceramic composition having high permittivity and excellent reliability, and a multilayer ceramic capacitor containing the same.

According to an aspect of the present disclosure, a dielectric ceramic composition contains a main base material ingredient and a first accessory ingredient, wherein the first accessory ingredient contains samarium (Sm) and other rare earth (RE) elements, and $0.1 \leq a/b \leq 2.0$, where a is a content of samarium (Sm) and b is a content of other rare earth elements in the first accessory ingredient.

The main base material ingredient may contain at least one selected from the group consisting of $BaTiO_3$, $(Ba_{1-x}Ca_x)(Ti_{1-y}Ca_y)O_3$ ($0 \leq x \leq 0.3$, $0 \leq y \leq 0.1$), $(Ba_{1-x}Ca_x)(Ti_{1-y}Zr_y)O_3$ ($0 \leq x \leq 0.3$, $0 \leq y \leq 0.5$), $Ba(Ti_{1-y}Zr_y)O_3$ ($0 \leq y \leq 0.5$), and $(Ba_{1-x}Ca_x)(Ti_{1-y}Sn_y)O_3$ ($0 \leq x \leq 0.3$, $0 \leq y \leq 0.5$).

According to another aspect of the present disclosure, a multilayer ceramic capacitor includes: a ceramic body in which dielectric layers and first and second internal electrodes are alternately stacked; and first and second external electrodes formed on both end portions of the ceramic body and electrically connected to the first and second internal electrodes, wherein the dielectric layers contain a dielectric ceramic composition containing a main base material ingredient and a first accessory ingredient, the first accessory ingredient containing samarium (Sm) and other rare earth (RE) elements, and $0.1 \leq a/b \leq 2.0$, where a is a content of samarium (Sm) and b is a content of other rare earth elements in the first accessory ingredient.

BRIEF DESCRIPTION OF THE DRAWINGS

The above and other aspects, features and other advantages of the present disclosure will be more clearly understood from the following detailed description taken in conjunction with the accompanying drawings.

DETAILED DESCRIPTION

Figure 1:
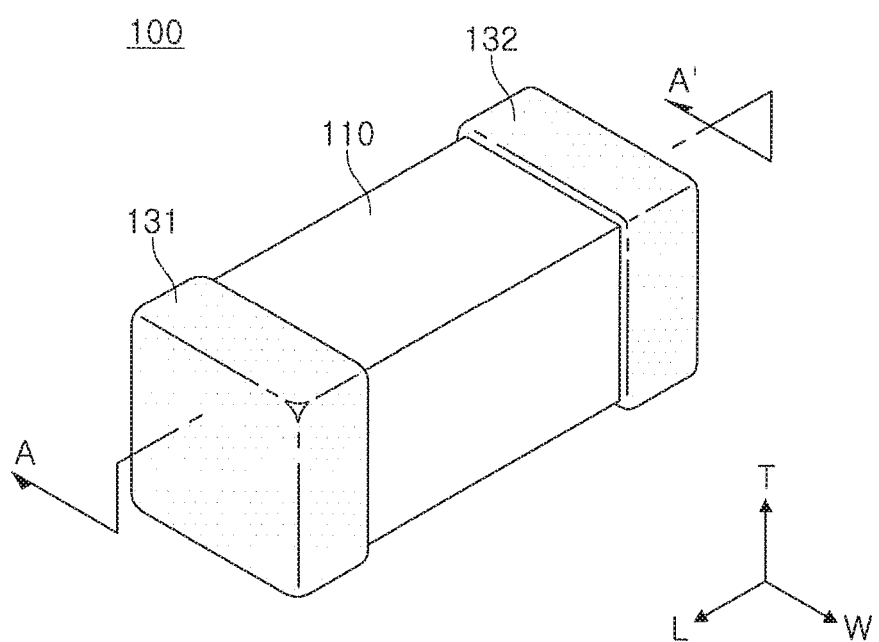
FIG. 1 is a schematic perspective view illustrating a multilayer ceramic capacitor according to an exemplary embodiment in the present disclosure.

Hereinafter, embodiments of the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

The present disclosure relates to a dielectric ceramic composition. Examples of an electronic component containing the dielectric ceramic composition include a capacitor, an inductor, a piezoelectric element, a varistor, a thermistor, or the like. Hereinafter, the dielectric ceramic composition and a multilayer ceramic capacitor as an example of the electronic component will be described.

A dielectric ceramic composition according to an exemplary embodiment in the present disclosure may contain a main base material ingredient and a first accessory ingredient, wherein the first accessory ingredient contains samarium (Sm) and other rare earth (RE) elements, and a ratio (a/b) of a content (a) of samarium (Sm) to a content (b) of other rare earth elements in the first accessory ingredient satisfies 0.1≤a/b≤2.0.

The dielectric ceramic composition according to the present disclosure may have permittivity of 5000 or more at room temperature.

Further, the multilayer ceramic capacitor using the dielectric ceramic composition according to the present disclosure may have increased permittivity without particle growth of dielectric grains in dielectric layers, and have excellent reliability.

Hereinafter, each ingredient of the dielectric ceramic composition according to the exemplary embodiment in the present disclosure will be described in detail.

a) Main Base Material Ingredient

In the dielectric ceramic composition according to the exemplary embodiment in the present disclosure, the main base material ingredient may contain at least one selected from the group consisting of $BaTiO_3$, $(Ba_{1-x}Ca_x)(Ti_{1-y}Ca_y)O_3$ (0≤x≤0.3, 0≤y≤0.1), $(Ba_{1-x}Ca_x)(Ti_{1-y}Zr_y)O_3$ (0≤x≤0.3, 0≤y≤0.5), $Ba(Ti_{1-y}Zr_y)O_3$ (0<y≤0.5), and $(Ba_{1-x}Ca_x)(Ti_{1-y}Sn_y)O_3$ (0≤x≤0.3, 0≤y≤0.5).

As described below, the dielectric ceramic composition may contain the main base material ingredient and the first accessory ingredient. The first accessory ingredient contains samarium (Sm) and other rare earth (RE) elements, and a ratio (a/b) of a content (a) of samarium (Sm) to a content (b) of other rare earth elements in the first accessory ingredient is adjusted to satisfy 0.1≤a/b≤2.0, such that a dielectric ceramic composition having high permittivity and excellent reliability may be provided.

That is, a dielectric ceramic composition capable of simultaneously having high permittivity and high reliability in spite of thinness of the dielectric layers may be provided by selecting samarium (Sm) having a high donor-type dopant tendency and adjusting a content ratio between samarium (Sm) and other added elements in order to increase permittivity without particle growth.

The main base material ingredient may be contained in powder form, and an average particle size of the main base material ingredient powder is not particularly limited but may be, for example, 1000 nm or less.

b) First Accessory Ingredient

The dielectric ceramic composition according to an exemplary embodiment in the present disclosure may contain the main base material ingredient and the first accessory ingredient. The first accessory ingredient may contain samarium (Sm) and other rare earth (RE) elements, and the ratio (a/b) of the content (a) of samarium (Sm) to the content (b) of other rare earth elements in the first accessory ingredient may satisfy 0.1≤a/b≤2.0.

Generally, in order to achieve high capacitance and thinness of a multilayer ceramic capacitor, it is essential to design a dielectric composition for a capacitor having high permittivity. In a technology for securing high permittivity, the object may be achieved by simply causing particle growth to adjust the number of dipoles in crystals.

At the time of designing a high permittivity composition by particle growth as described above, however, a capacitance change rate depending on a temperature and DC voltage applied thereto may be increased, and the number of particles per layer of the dielectric layers may be decreased, such that reliability may be deteriorated.

According to an exemplary embodiment in the present disclosure, in order to solve the above-mentioned problems, the first accessory ingredient may contain samarium (Sm) and other rare earth (RE) elements, and the ratio (a/b) of the content (a) of samarium (Sm) to the content (b) of other rare earth elements in the first accessory ingredient may be adjusted to satisfy 0.1≤a/b≤2.0.

The dielectric ceramic composition according to the exemplary embodiment in the present disclosure may further contain 0.1 to 3.0 at % of the first accessory ingredient based on 100 at % of main base material ingredient.

In general, the rare earth elements may be substituted in both a barium (Ba)-site and a titanium (Ti)-site depending on a Ba/Ti ratio in a barium titanate ($BaTiO_3$) lattice, and a substitution site may be determined based on an ionic radius difference between $Ba^{2+}$; and $Ti^{4+}$ ions.

Elements capable of substituting both the Ba-site and the Ti-site as described above may be referred to as amphoteric elements, and rare earth elements such as Dy, Y, or the like, may correspond thereto.

Meanwhile, among the rare earth (RE) elements, samarium (Sm), an element having high donor-type dopant tendency, may be mainly substituted at the barium (Ba)-site, unlike other rare earth elements.

The reason that samarium (Sm) is mainly substituted at the barium (Ba)-site as described above is due to an ionic radius difference with the $Ba^{2+}$ ion.

That is, the ionic radius of samarium (Sm) is closer to the ionic radius of the $Ba^2$ ion than are those of other rare earth elements.

Therefore, samarium (Sm), which is an element having high donor-type dopant tendency, may be mainly substituted at the barium (Ba)-site.

According to an exemplary embodiment in the present disclosure, the first accessory ingredient may contain samarium (Sm) among the rare earth (RE) elements, such that a donor-type dopant may be added and substituted at the barium (Ba)-site, thereby satisfying a charge neutrality condition by formation of electrons compensating for Ba-vacancy.

Therefore, since the formation concentration of oxygen vacancies may be controlled, the concentration of ion point defects inhibiting movement of a domain wall may be more effectively controlled.

That is, the dielectric ceramic composition as described above may effectively control a concentration of lattice defects capable of occurring in the lattice, such as defect dipoles, or the like, such that the dielectric ceramic composition may secure high permittivity even at the same particle size, and have excellent reliability.

Other rare earth elements, elements except for samarium (Sm), are not particularly limited, but may be, for example, one or more selected from the group consisting of oxides and carbonates of one or more selected from Y, Dy, Ho, Er, Gd, Ce, and Nd.

When the first accessory ingredient contains an excessive amount of samarium (Sm), room-temperature insulation resistance (IR) may be decreased. This decrease in room-temperature insulation resistance (IR) may be caused by an increase in electron concentration due to excessive addition of the element having the high donor-type dopant tendency.

Therefore, according to the exemplary embodiment in the present disclosures, the ratio (a/b) of the content (a) of samarium (Sm) to the content (b) of other rare earth elements in the first accessory ingredient may satisfy 0.1≤a/b≤2.0.

When the ratio (a/b) of the content (a) of samarium (Sm) to the content (b) of other rare earth elements is less than 0.1, the content (a) of samarium (Sm) is low, and it may be difficult to secure high permittivity at the same particle size, or there may be a decrease in reliability.

On the other hand, when the ratio (a/b) of the content (a) of samarium (Sm) to the content (b) of other rare earth elements is greater than 2.0, the content (a) of samarium (Sm) is high, such that room-temperature insulation resistance (IR) may be decreased.

The dielectric ceramic composition according to the exemplary embodiment in the present disclosure may further contain 0.1 to 3.0 at % of the first accessory ingredient based on 100 at % of main base material ingredient.

c) Second Accessory Ingredient

According to an exemplary embodiment in the present disclosure, the dielectric ceramic composition may further contain an oxide or carbonate containing at least one of Mn, V, Cr, Fe, Ni, Co, Cu, and Zn as a second accessory ingredient.

The dielectric ceramic composition may contain the second accessory ingredient, the oxide or carbonate containing at least one of Mn, V, Cr, Fe, Ni, Co, Cu, and Zn, at a content of 0.1 to 1.0 at % based on 100 at % of the main base material ingredient.

The second accessory ingredient may serve to decrease a sintering temperature of a multilayer ceramic capacitor using the dielectric ceramic composition and improve the high-temperature withstand voltage characteristics.

The content of the second accessory ingredient and the content of a third accessory ingredient to be described below, contents based on 100 at % of main base material ingredient, may be particularly defined as at % of metal ions contained in each of the accessory ingredients.

When the content of the second accessory ingredient is less than 0.1 at %, reduction resistance and reliability may be deteriorated.

When the content of the second accessory ingredient is greater than 1.0 at %, side effects such as an increase in the sintering temperature, a decrease in capacitance, an increase in an aging rate, and the like, may occur.

Particularly, the dielectric ceramic composition according to the exemplary embodiment in the present disclosure may further contain 0.1 to 1.0 at % of the second accessory ingredient based on 100 at % of main base material ingredient, such that the dielectric ceramic composition may be sintered at a low temperature and obtain excellent high-temperature withstand voltage characteristics.

d) Third Accessory Ingredient

According to the exemplary embodiment in the present disclosure, the dielectric ceramic composition may contain at least one of Mg and Al as a third accessory ingredient.

The dielectric ceramic composition may contain the third accessory ingredient, an oxide or carbonate containing at least one of Mg and Al, at a content of 0.1 to 1.0 at % based on 100 at % of the main base material ingredient.

The oxide or carbonate containing at least one of Mg and Al may be contained as the third accessory ingredient at a content of 0.1 to 1.0 at % based on 100 at % of the main base material ingredient.

The third accessory ingredient may serve to decrease the sintering temperature of the multilayer ceramic capacitor using the dielectric ceramic composition and improve the high-temperature withstand voltage characteristics.

When the content of the third accessory ingredient is less than 0.1 at %, reduction resistance and reliability may be deteriorated.

When the content of the third accessory ingredient is more than 1.0 at %, side effects such as an increase in the sintering temperature, a decrease in capacitance, an increase in an aging rate, and the like, may occur.

Particularly, the dielectric ceramic composition according to the exemplary embodiment in the present disclosure may further contain 0.1 to 1.0 at % of a third accessory ingredient based on 100 at % of main base material ingredient, such that the dielectric ceramic composition may be sintered at a low temperature and obtain excellent high-temperature withstand voltage characteristics.

d) Fourth and Fifth Accessory Ingredients

According to the exemplary embodiment in the present disclosure, the dielectric ceramic composition may contain an oxide or carbonate containing at least one of Ce, Nb, La, and Sb as a fourth accessory ingredient, and further contain an oxide or carbonate containing at least one of Si, Ba, Ca, and Al, or a glass compound containing Si as a fifth accessory ingredient.

The fourth accessory ingredient, the oxide or carbonate containing at least one of Ce, Nb, La, and Sb, may be added to the dielectric ceramic composition, such that reduction resistance and reliability may be improved.

Meanwhile, the fifth accessory ingredient, the oxide or carbonate containing at least one of Si, Ba, Ca, and Al, or the glass compound containing Si, may be added to the dielectric ceramic composition, such that the sintering temperature may be decreased, and the sintering may be promoted.

Figure 2:
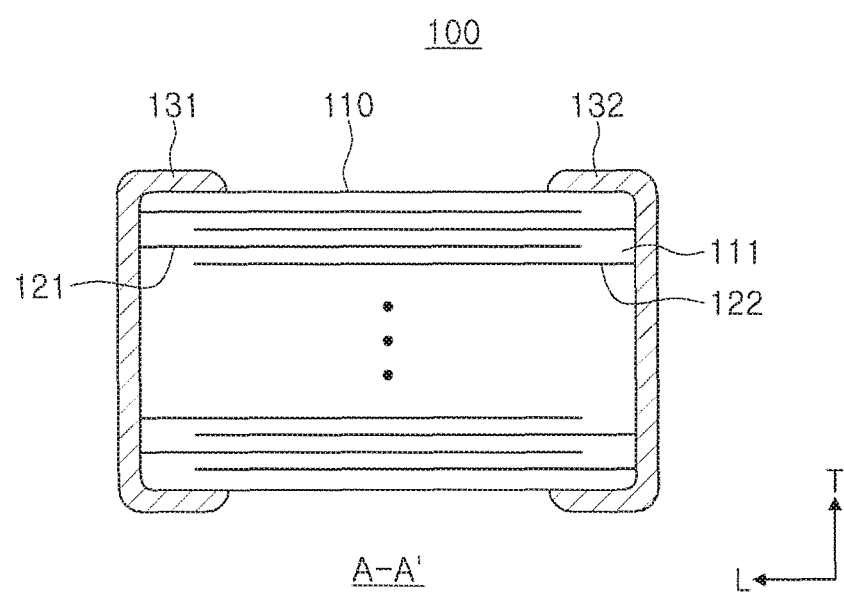
FIG. 2 is a schematic cross-sectional view illustrating the multilayer ceramic capacitor taken along line A-A' of FIG. 1.

FIG. 1 is a schematic perspective view illustrating a multilayer ceramic capacitor 100 according to an exemplary embodiment in the present disclosure, and FIG. 2 is a schematic cross-sectional view illustrating the multilayer ceramic capacitor 100 taken along the line A-A' of FIG. 1.

Referring to FIGS. 1 and 2, the multilayer ceramic capacitor 100 according to another exemplary embodiment in the present disclosure may include a ceramic body 110 in which dielectric layers 111 and first and second internal electrodes 121 and 122 are alternately stacked.

First and second external electrodes 131 and 132 electrically connected to the first and second internal electrodes 121 and 122 alternately disposed in the ceramic body 110, respectively, may be formed on both end portions of the ceramic body 110.

A shape of the ceramic body 110 is not particularly limited, but generally, may be a rectangular parallelepiped shape. In addition, dimensions of the ceramic body 110 are not particularly limited, and the ceramic body may have suitable dimensions depending on the intended use thereof. For example, the ceramic body may have dimensions of (0.6-5.6 mm)×(0.3-5.0 mm)×(0.3-1.9 mm).

A thickness of the dielectric layer 111 may be optionally changed according to a capacitance design of the capacitor. According to an exemplary embodiment in the present disclosure, a thickness of a single dielectric layer after sintering may preferably be 0.2 µm or more.

When the dielectric layer is excessively thin, the number of grains existing in a single dielectric layer is small, having a negative impact on reliability. Therefore, the thickness of the dielectric layer may be 0.2 µm or more.

The first and second internal electrodes 121 and 122 may be stacked so that end surfaces thereof are alternately exposed to surfaces of both end portions of the ceramic body 110 opposing each other, respectively.

The first and second external electrodes 131 and 132 may be formed on both end portions of the ceramic body 110 and may be electrically connected to the exposed end surfaces of the first and second internal electrodes 121 and 122 that are alternately disposed, thereby configuring a capacitor circuit.

A conductive material contained in the first and second internal electrodes 121 and 122 is not particularly limited. However, since a material configuring the dielectric layer according to the exemplary embodiment in the present disclosure may have a form in which a paraelectric material and a ferroelectric material are mixed with each other or solid-dissolved, a noble metal may be used.

The noble metal used as the conductive material may be palladium (Pd) or a palladium (Pd) alloy.

An example of the palladium (Pd) alloy may be an alloy of palladium (Pd) and at least one element selected from manganese (Mn), chromium (Cr), cobalt (Co), and aluminum (Al), wherein a content of palladium (Pd) in the alloy may be 95 wt % or more.

The noble metal used as the conductive material may also be silver (Ag) or a silver (Ag) alloy.

A thickness of the first and second internal electrodes 121 and 122 may be appropriately determined depending on the use, or the like, but is not particularly limited. For example, the thickness may be 0.1 to 5 µm, or 0.1 to 2.5 µm.

A conductive material contained in the first and second external electrodes 131 and 132 is not particularly limited, but nickel (Ni), copper (Cu), or an alloy thereof may be used.

A thickness of the first and second external electrodes 131 and 132 may be appropriately determined depending on the use, or the like, but is not particularly limited. For example, the thickness may be 10 to 50 µm.

The dielectric layer 111 configuring the ceramic body 110 may contain the dielectric ceramic composition according to the exemplary embodiment in the present disclosure.

The dielectric ceramic composition according to the exemplary embodiment in the present disclosure may contain the main base material ingredient and the accessory ingredient, wherein the accessory ingredient contains samarium (Sm) and other rare earth (RE) elements, and the ratio (a/b) of the content (a) of samarium (Sm) to the content (b) of other rare earth elements in the accessory ingredient satisfies $0.1 \leq a/b \leq 2.0$.

The main base material ingredient may contain at least one selected from the group consisting of $BaTiO_3$, $(Ba_{1-x}Ca_x)(Ti_{1-y}Ca_y)O_3$ ($0 \leq x \leq 0.3$, $0 \leq y \leq 0.1$), $(Ba_{1-x}Ca_x)(Ti_{1-y}Zr_y)O_3$ ($0 \leq x \leq 0.3$, $0 \leq y \leq 0.5$), $Ba(Ti_{1-y}Zr_y)O_3$ ($0 \leq y \leq 0.5$), and $(Ba_{1-x}Ca_x)(Ti_{1-y}Sn_y)O_3$ ($0 \leq x \leq 0.3$, $0 \leq y \leq 0.5$).

An average particle size of the dielectric grains of the dielectric layer 111 may be 0.05 to 0.8 µm.

According to another exemplary embodiment in the present disclosure, since the dielectric ceramic composition contains the main base material ingredient and the first accessory ingredient, the first accessory ingredient contains samarium (Sm) and other rare earth (RE) elements, and the ratio (a/b) of the content (a) of samarium (Sm) to the content (b) of other rare earth elements in the first accessory ingredient satisfies $0.1 \leq a/b \leq 2.0$, such that the dielectric ceramic composition may secure high permittivity even at the same particle size, and have excellent reliability.

Since features of the dielectric ceramic composition are the same as those of the dielectric ceramic composition according to the exemplary embodiment in the present disclosure described above, a detailed description thereof will be omitted.

Hereinafter, the present disclosure will be described in detail through reference to the Inventive Examples and Comparative Examples, provided to help in gaining a specific understanding of the present disclosure. Therefore, the scope of the present disclosure is not limited to Inventive Examples.

$BaTiO_3$ powder having a particle size of 100 nm was used as a main base material ingredient, and a composition of a first accessory ingredient and a ratio (a/b) of a content (a) of samarium (Sm) to a content (b) of other rare earth elements were adjusted as illustrated in the following Table 1.

At the time of preparing a slurry, zirconia balls were used as a mixing/dispersing media, and the main base material ingredient and accessory ingredient powder were mixed with ethanol/toluene, a dispersant, and a binder and then ball-milled for 15 hours.

A sheet having a thickness of 2 µm or less was manufactured from the prepared slurry mixture using an off roll type coater.

A nickel (Ni) internal electrode was printed on the sheet, upper and lower covers were manufactured by stacking several tens of cover sheets, and the sheets on which the internal electrodes were printed were compressed and stacked, thereby manufacturing a bar. The compressed bar was cut into chips having 1005 size (length×width×thickness: about 1.0 mm×0.5 mm×0.5 mm) using a cutter.

After each cut chip was calcined and sintered at 1130 to 1160° C. for 1 hour under a reducing atmosphere (0.1% $H_2/99.9\%\ N_2$, $H_2O/H_2/N_2$), external electrodes were completed by terminating the sintered chip using a copper (Cu) paste and sintering the formed electrodes.

Room-temperature capacitance, dissipation factors (DFs), insulation resistance, temperature coefficients of capacitance (TCCs), high-temperature reliability, and the like, of multilayer ceramic capacitors completed as described above were evaluated.

The room-temperature capacitance and the dissipation factors of the multilayer ceramic capacitor (MLCC) were measured using a LCR-meter under the conditions of 1 kHz and AC 1.0 V/µm.

Permittivity (relative permittivity) of the multilayer ceramic capacitor (MLCC) chip was calculated from the capacitance, a dielectric thickness, an area of internal electrodes, and the number of stacked layers of the multilayer ceramic capacitor (MLCC) chip.

Room-temperature insulation resistance (IR) was measured after 60 seconds in a state in which 10 samples each were taken, and a DC voltage of 10 V/µm was applied thereto.

The temperature coefficient of capacitance (TCC) was evaluated by measuring a capacitance value in a temperature range of −55° C. to 85° C. under the conditions of 1 kHz and AC 1.0 V/µm and calculating a capacitance change rate based on a capacitance value at room temperature (25° C.).

In order to compare high-temperature reliability levels, samples each were taken, and a highly accelerated life test (HALT) was performed under the conditions of 130° C. and DC 8 V (2 Vr) for 4 hours.

TABLE 1

| Experimental Example | The Number of Mole of Each Accessory Ingredient per 1.0 Mole of Main base material ingredient | | | | | | | | | |
|---|---|---|---|---|---|---|---|---|---|---|
| | $Sm_2O_3$ (a) | $Dy_2O_3$ (b) | $Y_2O_3$ (b) | $BaCO_3$ | $ZrO_2$ | $Mn_3O_4$ | $V_2O_5$ | $Al_2O_3$ | $SiO_2$ | a/b |
| *1 | 1.50 | 0.00 | 0.00 | 0.70 | 0.50 | 0.20 | 0.05 | 0.10 | 1.25 | — |
| *2 | 1.20 | 0.30 | 0.00 | | | | | | | 4.00 |

TABLE 1-continued

| Experimental Example | The Number of Mole of Each Accessory Ingredient per 1.0 Mole of Main base material ingredient | | | | | | | | | |
|---|---|---|---|---|---|---|---|---|---|---|
| | $Sm_2O_3$ (a) | $Dy_2O_3$ (b) | $Y_2O_3$ (b) | $BaCO_3$ | $ZrO_2$ | $Mn_3O_4$ | $V_2O_5$ | $Al_2O_3$ | $SiO_2$ | a/b |
| 3 | 1.00 | 0.50 | 0.00 | | | | | | | 2.00 |
| 4 | 0.60 | 0.90 | 0.00 | | | | | | | 0.67 |
| 5 | 0.30 | 1.20 | 0.00 | | | | | | | 0.25 |
| 6 | 0.15 | 1.35 | 0.00 | | | | | | | 0.11 |
| *7 | 0.00 | 1.50 | 0.00 | | | | | | | 0.00 |
| *8 | 1.20 | 0.00 | 0.30 | | | | | | | 4.00 |
| 9 | 1.00 | 0.00 | 0.50 | | | | | | | 2.00 |
| 10 | 0.60 | 0.00 | 0.90 | | | | | | | 0.67 |
| 11 | 0.30 | 0.00 | 1.20 | | | | | | | 0.25 |
| 12 | 0.15 | 0.00 | 1.35 | | | | | | | 0.11 |
| *13 | 0.00 | 0.00 | 1.50 | | | | | | | 0.00 |

*Comparative Example

TABLE 2

| Experimentel Example | Properties of Proto-type Chip | | | | | Judgment of Properties | | | |
|---|---|---|---|---|---|---|---|---|---|
| | Permittivity | DF (%) | Resistivity (Ω * cm) | TCC (%) (85° C.) | High-Temperature Withstand Voltage (V/μm) | Permittivity, DF | Resistivity | TCC (%) (85° C.) | High-Temperature Withstand Voltage |
| *1 | 6789 | 8.12 | 1.77E+10 | −11.5 | 60 | ○ | Δ | ○ | ○ |
| *2 | 6453 | 7.88 | 7.35E+10 | −11.8 | 65 | ○ | Δ | ○ | ○ |
| 3 | 5987 | 7.16 | 2.58E+11 | −10.9 | 60 | ○ | ○ | ○ | ○ |
| 4 | 5689 | 7.26 | 4.05E+11 | −10.8 | 60 | ○ | ○ | ○ | ○ |
| 5 | 5410 | 7.32 | 6.98E+11 | −11.1 | 65 | ○ | ○ | ○ | ○ |
| 6 | 5198 | 6.92 | 9.01E+11 | −11.2 | 65 | ○ | ○ | ○ | ○ |
| *7 | 3894 | 6.58 | 1.12E+12 | −10.9 | 65 | Δ | ○ | ○ | ○ |
| *8 | 6245 | 7.98 | 3.98E+10 | −10.7 | 60 | ○ | Δ | ○ | ○ |
| 9 | 5792 | 7.87 | 1.12E+11 | −10.7 | 65 | ○ | ○ | ○ | ○ |
| 10 | 5421 | 7.24 | 4.64E+11 | −11.0 | 70 | ○ | ○ | ○ | ○ |
| 11 | 5120 | 6.98 | 6.38E+11 | −11.2 | 65 | ○ | ○ | ○ | ○ |
| 12 | 5099 | 6.89 | 8.92E+11 | −10.9 | 62 | ○ | ○ | ○ | ○ |
| *13 | 3421 | 6.01 | 1.08E+12 | −11.1 | 68 | x | ○ | ○ | ○ |

○ Good,
Δ Fair,
x Poor
*Comparative Example

Referring to Table 2, it may be appreciated that as the accessory ingredient contained samarium (Sm) among rare earth (RE) elements and a ratio of added samarium (Sm) was increased, permittivity tended to proportionally increase, the DF may be stably secured at the same time, and withstand voltage characteristics may be implemented at the same level or more.

It may also be appreciated that when the ratio of the added samarium was excessive, room-temperature insulation resistance (IR) was decreased.

That is, it may be appreciated that in Experimental Examples 3 to 6 and 9 to 12 (Inventive Examples) corresponding to cases in which the ratio (a/b) of the content (a) of samarium (Sm) to the content (b) of other rare earth elements satisfied 0.1≤a/b≤2.0, high permittivity may be secured, and reliability was excellent.

On the other hand, it may also be appreciated that in Experimental Examples 1, 2, 7, 8, and 13 (Comparative Examples) corresponding to cases in which the ratio (a/b) of the content (a) of samarium (Sm) to the content (b) of other rare earth elements did not satisfy 0.1≤a/b≤2.0, permittivity was low, or room-temperature insulation resistance (IR) was low, and such that there was a problem in reliability.

As set forth above, according to exemplary embodiments in the present disclosure, the dielectric ceramic composition capable of simultaneously having high permittivity and high reliability in spite of thinness of the dielectric layers may be provided by selecting samarium (Sm) having the high donor-type dopant tendency and adjusting the content ratio between samarium (Sm) and other added elements.

Further, the dielectric ceramic composition as described above may effectively control the concentration of the lattice defects capable of occurring in the lattice, such as defect dipoles, or the like, such that the dielectric ceramic composition may secure high permittivity even at the same particle size, and have excellent reliability.

While exemplary embodiments have been shown and described above, it will be apparent to those skilled in the art that modifications and variations could be made without departing from the scope of the present invention as defined by the appended claims.

What is claimed is:

1. A dielectric ceramic composition comprising a main base material ingredient and a first accessory ingredient, wherein the first accessory ingredient contains samarium (Sm) and at least one selected from the group consisting of dysprosium (Dy) and yttrium (Y).

2. The dielectric ceramic composition of claim 1, wherein the main base material ingredient contains at least one selected from the group consisting of $BaTiO_3$, $(Ba_{1-x}Ca_x)$ $(Ti_{1-y}Ca_y)O_3$ $(0 \leq x \leq 0.3, 0 \leq y \leq 0.1)$, $(Ba_{1-x}Ca_x)(Ti_{1-y}Zr_y)O_3$ $(0 \leq x \leq 0.3, 0 \leq y \leq 0.5)$, $Ba(Ti_{1-y}Zr_y)O_3$ $(0 < y \leq 0.5)$, and $(Ba_{1-x}Ca_x)(Ti_{1-y}Sn_y)O_3$ $(0 \leq x \leq 0.3, 0 \leq y \leq 0.5)$.

3. The dielectric ceramic composition of claim 1, further containing 0.1 to 1.0 at % of a second accessory ingredient, an oxide or carbonate containing at least one of Mn, V, Cr, Fe, Ni, Co, Cu, and Zn, based on 100 at % of the main base material ingredient.

4. The dielectric ceramic composition of claim 1, further containing 0.1 to 1.0 at % of a third accessory ingredient, an oxide or carbonate containing at least one of Mg and Al, based on 100 at % of the main base material ingredient.

5. The dielectric ceramic composition of claim 1, further containing a fourth accessory ingredient, an oxide or carbonate containing at least one of Ce, Nb, La, and Sb; and a fifth accessory ingredient, an oxide or carbonate containing at least one of Si, Ba, Ca, and Al, or a glass compound containing Si.

6. The dielectric ceramic composition of claim 1, wherein a permittivity is 5000 or more at room temperature.

7. The dielectric ceramic composition of claim 1, wherein an average particle size of the main base material ingredient powder is 1000 nm or less.

8. A multilayer ceramic capacitor comprising:
a ceramic body in which dielectric layers and first and second internal electrodes are alternately stacked; and
first and second external electrodes formed on both end portions of the ceramic body and electrically connected to the first and second internal electrodes,
wherein the dielectric layers contain a dielectric ceramic composition containing a main base material ingredient and a first accessory ingredient, the first accessory ingredient containing samarium (Sm) and at least one selected from the group consisting of dysprosium (Dy) and yttrium (Y).

9. The multilayer ceramic capacitor of claim 8, wherein the main base material ingredient contains at least one selected from the group consisting of $BaTiO_3$, $(Ba_{1-x}Ca_x)(Ti_{1-y}Ca_y)O_3$ $(0 \leq x \leq 0.3, 0 \leq y \leq 0.1)$, $(Ba_{1-x}Ca_x)(Ti_{1-y}Zr_y)O_3$ $(0 \leq x \leq 0.3, 0 \leq y \leq 0.5)$, $Ba(Ti_{1-y}Zr_y)O_3$ $(0 < y \leq 0.5)$, and $(Ba_{1-x}Ca_x)(Ti_{1-y}Sn_y)O_3$ $(0 \leq x \leq 0.3, 0 \leq y \leq 0.5)$.

10. The multilayer ceramic capacitor of claim 8, wherein the dielectric ceramic composition further contains 0.1 to 1.0 at % of a second accessory ingredient, an oxide or carbonate containing at least one of Mn, V, Cr, Fe, Ni, Co, Cu, and Zn, based on 100 at % of the main base material ingredient.

11. The multilayer ceramic capacitor of claim 8, wherein the dielectric ceramic composition further contains 0.1 to 1.0 at % of a third accessory ingredient, an oxide or carbonate containing at least one of Mg and Al, based on 100 at % of the main base material ingredient.

12. The multilayer ceramic capacitor of claim 8, wherein the dielectric ceramic composition further contains a fourth accessory ingredient, an oxide or carbonate containing at least one of Ce, Nb, La, and Sb; and a fifth accessory ingredient, an oxide or carbonate containing at least one of Si, Ba, Ca, and Al, or a glass compound containing Si.

13. The multilayer ceramic capacitor of claim 8, wherein an average particle size of dielectric grains of the dielectric layer is 0.05 to 0.8 µm.

14. The multilayer ceramic capacitor of claim 8, wherein a permittivity is 5000 or more at room temperature.

15. The multilayer ceramic capacitor of claim 8, wherein an average particle size of the main base material ingredient powder is 1000 nm or less.

16. The dielectric ceramic composition of claim 3, further containing 0.1 to 1.0 at % of a third accessory ingredient, an oxide or carbonate containing at least one of Mg and Al, based on 100 at % of the main base material ingredient.

17. The dielectric ceramic composition of claim 1, wherein a content of the first accessory ingredient is 0.1 to 3.0%, based on 100 at % of the main base material ingredient.

18. A dielectric ceramic composition comprising a main base material ingredient and containing:
0.1 to 3.0 at % of a first accessory ingredient, the first accessory ingredient containing samarium (Sm) and at least one other rare earth (RE) element, and $0.1 \leq a/b \leq 2.0$, where a is a molar content of samarium (Sm) and b is a molar content of the at least one other rare earth element in the first accessory ingredient, based on 100 at % of the main base material ingredient;
0.1 to 1.0 at % of a second accessory ingredient, an oxide or carbonate containing at least one of Mn, V, Cr, Fe, Ni, Co, Cu, and Zn, based on 100 at % of the main base material ingredient; and
0.1 to 1.0 at % of a third accessory ingredient, an oxide or carbonate containing at least one of Mg and Al, based on 100 at % of the main base material ingredient.

19. The dielectric ceramic composition of claim 18, further containing a fourth accessory ingredient, an oxide or carbonate containing at least one of Ce, Nb, La, and Sb; and a fifth accessory ingredient, an oxide or carbonate containing at least one of Si, Ba, Ca, and Al, or a glass compound containing Si.

20. The dielectric ceramic composition of claim 1, wherein $0.1 \leq a/b \leq 2.0$, where a is a molar content of samarium (Sm) and b is a molar content of dysprosium (Dy) and yttrium (Y) in the first accessory ingredient.

21. The dielectric ceramic composition of claim 8, wherein $0.1 \leq a/b \leq 2.0$, where a is a molar content of samarium (Sm) and b is a molar content of dysprosium (Dy) and yttrium (Y) in the first accessory ingredient.

* * * * *